United States Patent
Pan et al.

(10) Patent No.: US 11,827,105 B2
(45) Date of Patent: Nov. 28, 2023

(54) INDEPENDENT-DRIVE SET AND WHEELED VEHICLE HAVING THE SAME

(71) Applicant: Wistron Corporation, New Taipei (TW)

(72) Inventors: Shih-Li Pan, New Taipei (TW); Ssu-Chieh Kao, New Taipei (TW); Jian-Rong Liao, New Taipei (TW); Ching-Chih Tung, New Taipei (TW); Chih-Ying Wu, New Taipei (TW); Jen Chieh Cheng, New Taipei (TW); Chih-Wei Liao, New Taipei (TW)

(73) Assignee: WISTRON CORPORATION, New Taipei (TW)

(*) Notice: Subject to any disclaimer, the term of this patent is extended or adjusted under 35 U.S.C. 154(b) by 0 days.

(21) Appl. No.: 17/958,652

(22) Filed: Oct. 3, 2022

(65) Prior Publication Data

US 2023/0025592 A1 Jan. 26, 2023

Related U.S. Application Data

(63) Continuation-in-part of application No. 17/144,186, filed on Jan. 8, 2021, now Pat. No. 11,505,022.

(30) Foreign Application Priority Data

Oct. 20, 2020 (TW) .................. 109136345

(51) Int. Cl.
*B60K 7/00* (2006.01)
*B60K 17/04* (2006.01)

(52) U.S. Cl.
CPC .......... *B60K 7/0007* (2013.01); *B60K 17/043* (2013.01); *B60K 2007/0046* (2013.01)

(58) Field of Classification Search
CPC ........ B60G 7/001; B60G 7/02; B60G 13/003; B60G 2204/143; B60K 7/0007; B60K 17/043

See application file for complete search history.

(56) References Cited

U.S. PATENT DOCUMENTS 3,175,637 A    3/1965   Honda
5,343,974 A *  9/1994   Rabek .................. B60K 7/0007
                                                      180/170

(Continued)

FOREIGN PATENT DOCUMENTS

CN    106891680 A    6/2017
CN    210555250 U *  5/2020

(Continued)

OTHER PUBLICATIONS

Examination report dated May 26, 2023, listed in related China patent application No. 202011268343.8.

(Continued)

*Primary Examiner* — Paul N Dickson
*Assistant Examiner* — Tiffany L Webb
(74) *Attorney, Agent, or Firm* — McClure, Qualey & Rodack, LLP

(57) ABSTRACT

A wheeled vehicle includes a vehicle body, a vibration absorbing element, an auxiliary arm, a wheel, and a driving member. The vehicle body includes a fixing plate. The housing connected to the fixing plate. The vibration absorbing element includes a first end and a second end. The first end is fixed to the housing. The auxiliary arm includes a connecting end and a free end. The connecting end is connected to the housing. The free end is configured to swing relative to the connecting end. The free end is fixed to the second end. The wheel includes an axle, and the axle is (Continued)

rotationally connected to the free end. The driving member is fixed to the housing and configured to drive the wheel.

17 Claims, 12 Drawing Sheets

(56) References Cited

U.S. PATENT DOCUMENTS

| | | | |
|---|---|---|---|
| 5,540,297 A | 7/1996 | Meier | |
| 6,341,660 B1 * | 1/2002 | Schiller | B62M 7/12 180/65.6 |
| 6,904,988 B2 * | 6/2005 | Harrup | B60K 7/0007 180/65.6 |
| 7,731,211 B2 * | 6/2010 | Ramsey | B60G 21/051 280/124.157 |
| 7,967,101 B2 | 6/2011 | Buschena | |
| 8,172,032 B2 * | 5/2012 | Buschena | B60K 17/043 474/146 |
| 10,773,564 B2 * | 9/2020 | Watt | B60K 7/0007 |
| 10,793,001 B2 * | 10/2020 | Yu | F16H 7/1281 |
| 2002/0043422 A1 | 4/2002 | Suzuki | |
| 2004/0124019 A1 | 7/2004 | Harrup et al. | |
| 2006/0244234 A1 | 11/2006 | Ramsey | |
| 2019/0092112 A1 | 3/2019 | Watt et al. | |
| 2019/0184822 A1 * | 6/2019 | Vigen | B60K 17/08 |
| 2019/0345992 A1 * | 11/2019 | Mariotti | B62M 11/06 |

FOREIGN PATENT DOCUMENTS

| | | | | |
|---|---|---|---|---|
| CN | 109677504 B | * | 9/2020 | B62D 63/02 |
| CN | 211663019 U | | 10/2020 | |

OTHER PUBLICATIONS

Examination report dated Mar. 23, 2023, listed in related Taiwan patent application No. 109136345.(publication No. TW 202216485).

* cited by examiner

INDEPENDENT-DRIVE SET AND WHEELED VEHICLE HAVING THE SAME

CROSS-REFERENCE TO RELATED APPLICATION

The present application is a continuation-in-part of U.S. patent application Ser. No. 17/144,186 filed Jan. 8, 2021, entitled "INDEPENDENT-DRIVE SET, INDEPENDENT-DRIVE ASSEMBLY AND WHEELED VEHICLE HAVING THE SAME", now issued as U.S. Pat. No. 11,505,022.

BACKGROUND

Technical Field

The present disclosure relates to an independent-drive assembly, and in particular, to an independent-drive assembly suitable for a wheeled vehicle.

Related Art

An automated guided vehicle (AGV) is widely used in an automatic production system. Due to the heavy load, the AGV often selects a high-power motor for driving. When the motor is suspended between a vibration system and the ground, it is difficult to the vibration system to respond vibrations from the ground in time to protect the motor. Due to the uneven ground, such configuration (the motor suspended between the vibration system and the ground) will cause the motor being repeatedly vibrated, which may shorten the life of the motor.

SUMMARY

In view of this, according to some embodiments, a wheeled vehicle having an independent-drive assembly includes a vehicle body, a housing, a vibration absorbing element, an auxiliary arm, a wheel, and a driving member. The vehicle body includes a fixing plate. The housing is connected to the fixing plate. The vibration absorbing element includes a first end and a second end, and the first end is connected to the housing. The auxiliary arm includes a connecting end and a free end, the connecting end is connected to the housing, and the free end is connected to the second end. The wheel includes an axle, and the axle is rotationally connected to the free end. The driving member is fixed to the housing and configured to drive the wheel.

In some embodiments, the auxiliary arm is a rocker arm, and the connecting end of the rocker arm is pivotally connected to the housing, so that the free end pivots relative to the connecting end.

In some embodiments, the auxiliary arm is a cantilever, and a connecting end of the cantilever is fixed to the housing, so that the free end is bent relative to the connecting end due to elasticity of the cantilever.

In some embodiments, a transmission mechanism is further included, and the driving member is configured to drive the wheel through the transmission mechanism.

In some embodiments, the transmission mechanism includes a driving wheel, a driven wheel, and a flexible element. The driving wheel is rotationally connected to the connecting end. The driven wheel is rotationally connected to the free end. The flexible element is connected to the driving wheel and the driven wheel, and the driving member is configured to drive the wheel through the driving wheel, the flexible element, and the driven wheel.

In some embodiments, the driving wheel is a driving pulley, the driven wheel is a driven pulley, and the flexible element is a belt, where the belt is connected to the driving pulley and the driven pulley, and the driving member is configured to drive the wheel through the driving pulley, the belt, and the driven pulley.

In some embodiments, the driving wheel is a driving chain wheel, the driven wheel is a driven chain wheel, and the flexible element is a chain, where the chain is connected to the driving chain wheel and the driven chain wheel, and the driving member is configured to drive the wheel through the driving chain wheel, the chain, and the driven chain wheel.

In some embodiments, the transmission mechanism further includes a reduction gear set, and the driving member is configured to drive the driving wheel through the reduction gear set.

In some embodiments, the vibration absorbing element is a shock absorber.

In some embodiments, the housing comprises a guide plate, the auxiliary arm comprises a guide wheel, the guide wheel is arranged at the free end, and the guide wheel is movably in contact with the guide plate.

According to some embodiments, an independent-drive set is adapted to a vehicle body includes locking plate. The independent-drive set includes a housing, a vibration absorbing element, an auxiliary arm, a wheel, and a driving member. The housing is adapted to connected to the fixing plate. The vibration absorbing element includes a first end and a second end, and the first end is adapted to be connected to the housing. The auxiliary arm includes a connecting end and a free end, the connecting end is adapted to be connected to the housing, and the free end is connected to the second end. The wheel includes an axle, and the axle is rotationally connected to the free end. The driving member is adapted to be fixed to the housing and configured to drive the wheel.

According to some embodiments, an independent-drive set is adapted to a vehicle body. The independent-drive set includes a vibration absorbing element, an auxiliary arm and a drive component. The vibration absorbing element includes a first end and a second end. The first end is adapted to be connected to the vehicle body. The auxiliary arm includes a connecting end and a free end, wherein the connecting end is adapted to be connected to the vehicle body, and the free end is connected to the second end. The drive component includes a driving member and a wheel, the driving member is connected to the wheel.

In some embodiments, the vehicle body comprises a guide plate, the auxiliary arm comprises a guide wheel, the guide wheel is arranged at the free end, and the guide wheel is movably in contact with the guide plate.

In some embodiments, the first end of the vibration absorbing element is adapted to be pivotally connected to the vehicle body, so that the second end pivots relative to the first end.

In some embodiments, the driving member and the wheel are respectively fixed on opposite sides of the auxiliary arm.

Based on the above, according to some embodiments, the independent-drive set may be matched with the vehicle body shown in FIG. 1, or may be matched with other vehicle bodies. According to some embodiments, the driving member drives the wheel, and when the independent drive assembly vibrates due to influence of the uneven ground, the free end of the auxiliary arm swings relative to the connecting end, and the vibration absorbing element between the vehicle body and the auxiliary arm vibrates for cushioning, so that the vibration on the driving member fixed to the vehicle body will be alleviated.

DETAILED DESCRIPTION

Figure 1:
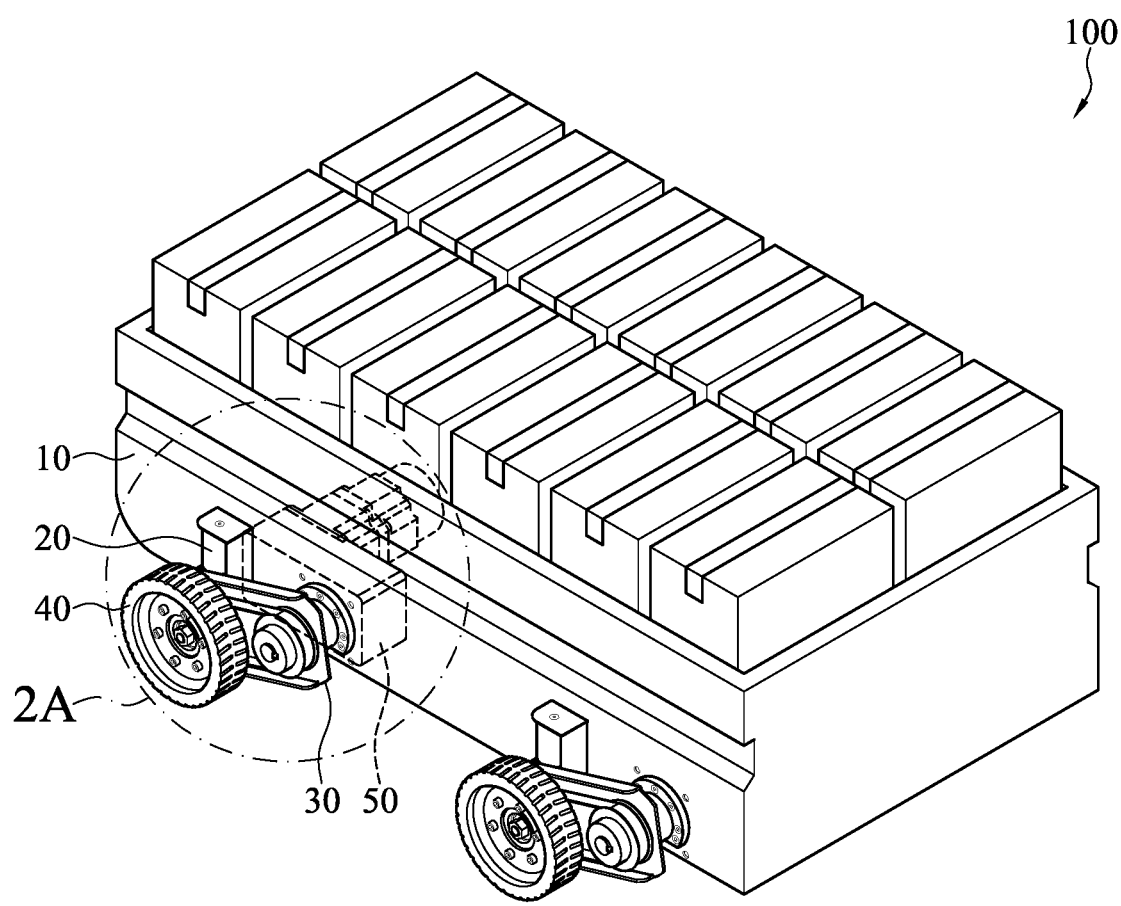
FIG. 1 illustrates a three-dimensional view of a wheeled vehicle according to some embodiments.

FIG. 1 illustrates a three-dimensional view of a wheeled vehicle according to some embodiments. A wheeled vehicle 100 includes a vehicle body 10, a vibration absorbing element 20, an auxiliary arm 30, a wheel 40, and a driving member. In some embodiments, the vehicle body is made of metal such as steel, aluminum alloy, or titanium alloy. In other implementations, the vehicle body may also be made of carbon fiber, to reduce the overall weight of the vehicle body 10. In some embodiments, the driving member may be a motor, and the driving member is represented by a motor 50 in the following embodiments.

Figure 8:
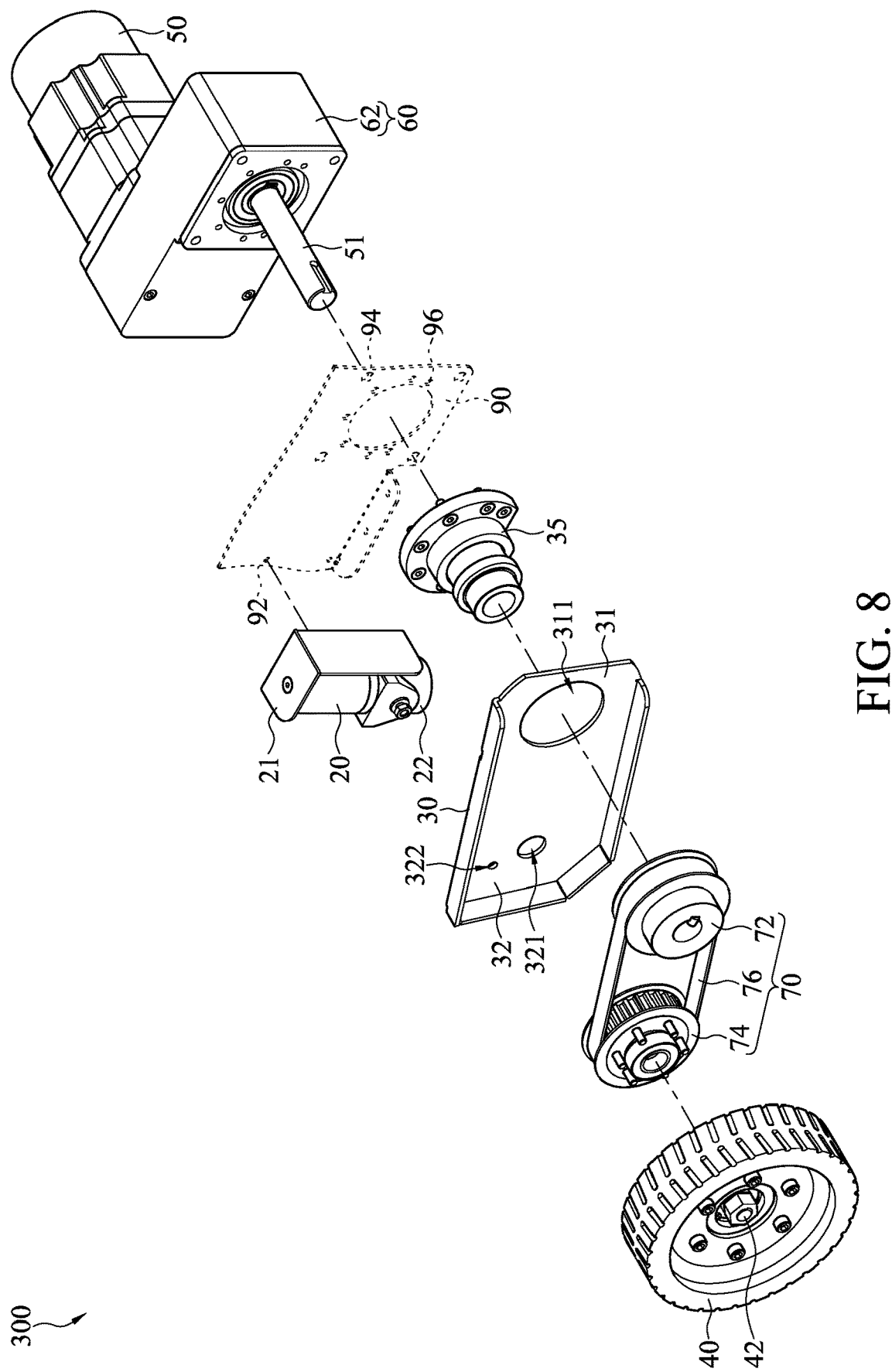
FIG. 8 illustrates a three-dimensional exploded view of an independent-drive set according to some embodiments.

The wheeled vehicle 100 is a variety of electric vehicles using wheels as travelling power, for example but not limited to an automated guided vehicle (AGV), an electric vehicle for riding, an electric passenger vehicle, and the like. The wheeled vehicle 100 may also be a vehicle that selectively uses wheels as travelling power, for example, an amphibious wheeled vehicle. In some embodiments, the vibration absorbing element 20, the auxiliary arm 30, the wheel 40, and a motor 50 form an independent-drive set 300 (described in detail later), and the wheeled vehicle 100 may include four independent-drive sets 300 (as shown in FIG. 8) or only two independent-drive sets 300.

Figure 2A:
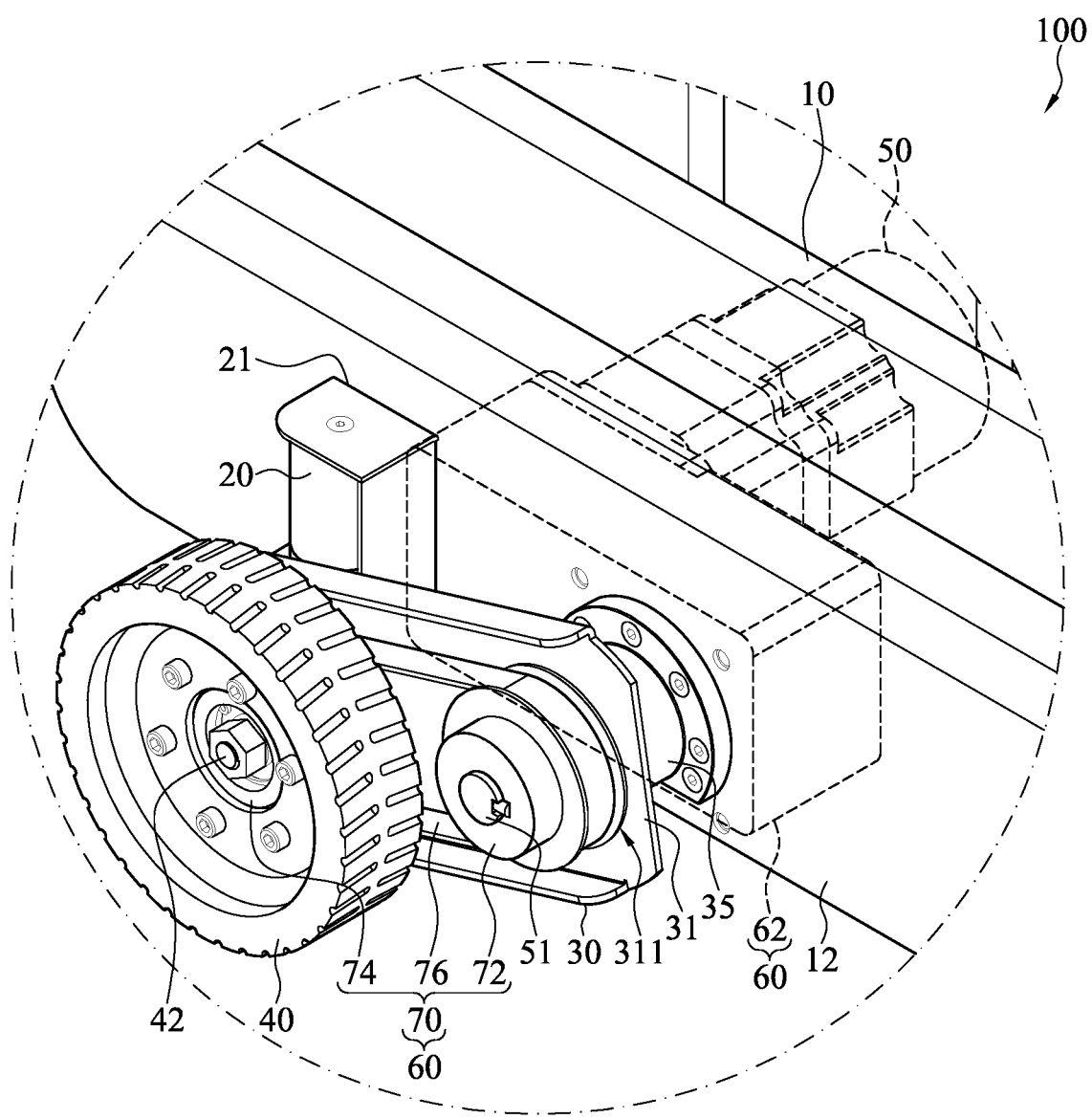
FIG. 2A illustrates a partial three-dimensional view of FIG. 1.
Figure 2B:
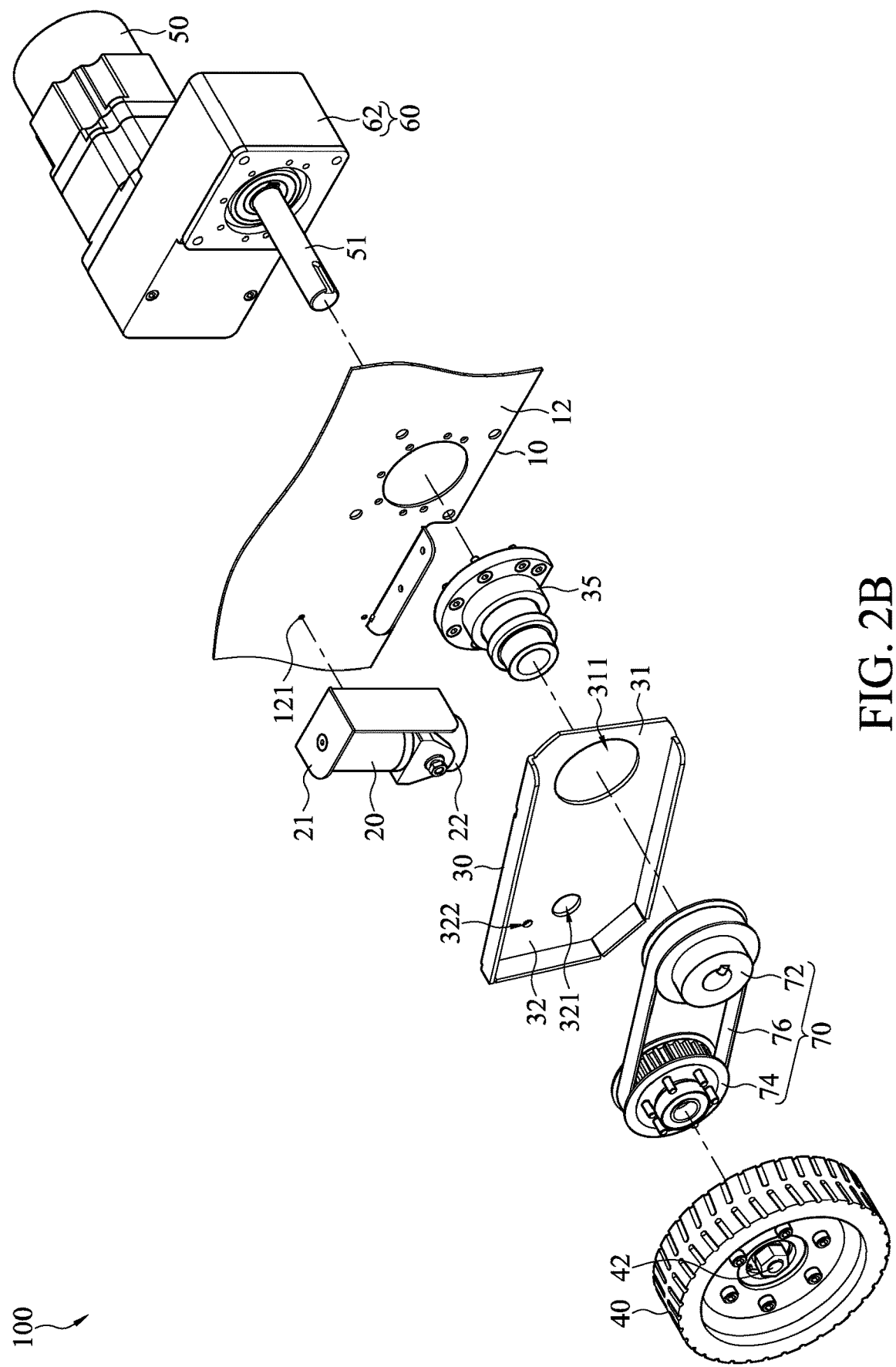
FIG. 2B illustrates a partial three-dimensional exploded view of FIG. 2A.

Referring to FIG. 2A and FIG. 2B, FIG. 2A illustrates a partial exploded view of a wheeled vehicle according to some embodiments. FIG. 2B illustrates a three-dimensional exploded view of FIG. 2A. The vibration absorbing element 20 includes a first end 21 and a second end 22. The first end 21 is connected to the vehicle body 10. The auxiliary arm 30 includes a connecting end 31 and a free end 32, the connecting end 31 is connected to the vehicle body 10, and the free end 32 is connected to the second end 22 of the vibration absorbing element 20. The wheel 40 includes an axle 42, and the axle 42 is rotationally connected to the free end 32. The motor 50 is fixed to the vehicle body 10 and configured to drive the wheel 40 to rotate. In some embodiments, the free end 32 is configured to swing relative to the connecting end 31.

Figure 3:
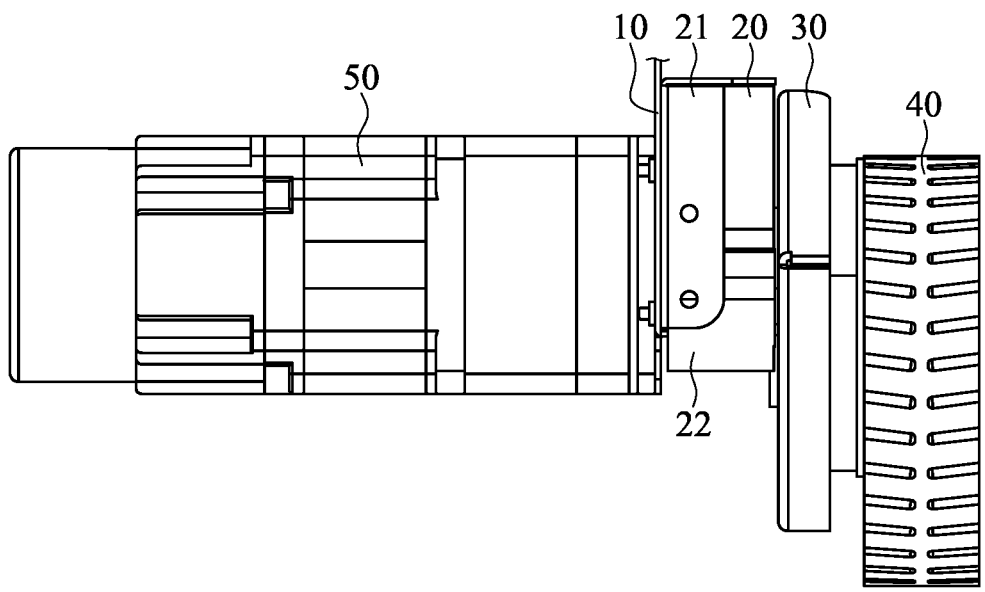
FIG. 3 illustrates a left view of FIG. 2A.
Figure 4:
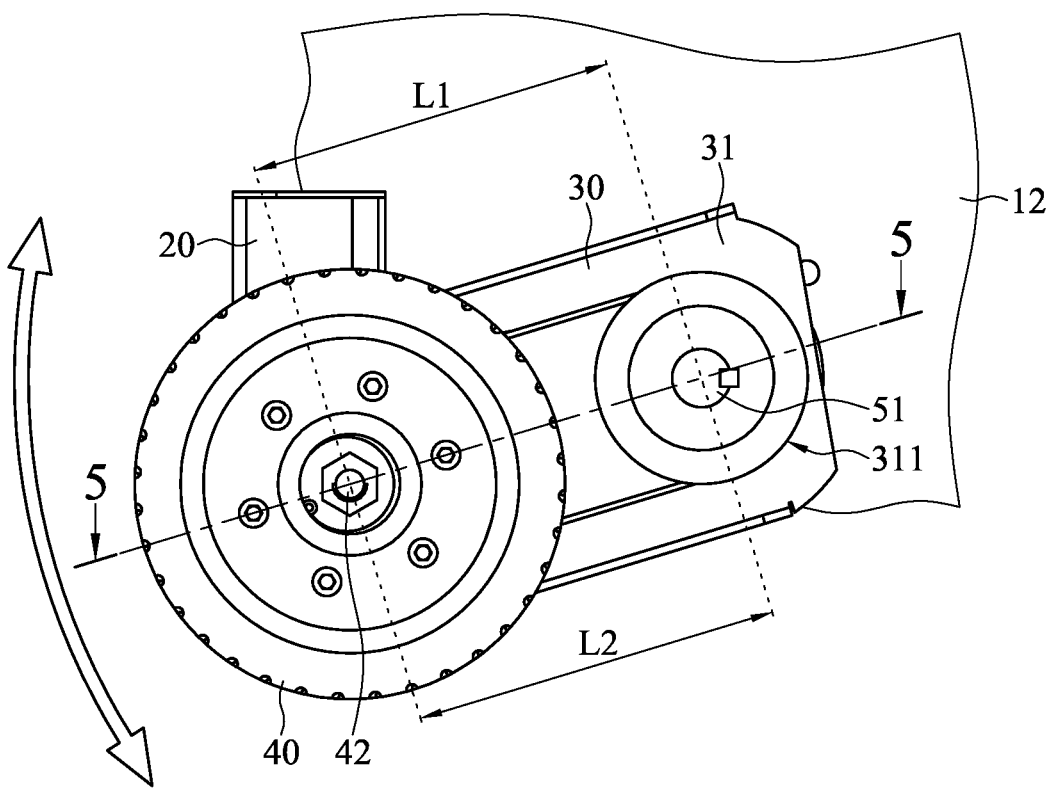
FIG. 4 illustrates a front view of FIG. 2A.

Referring to FIG. 3 and FIG. 4 together, FIG. 3 illustrates a left view of FIG. 2A. FIG. 4 illustrates a front view of FIG. 2A. During operation, the motor 50 drives the wheel 40 to rotate, and the wheeled vehicle 100 can travel. During travelling, the weight of the wheeled vehicle 100 will press the wheel 40 downward, so that the wheel 40 is attached to the travelling surface. When the wheeled vehicle 100 travels to the uneven surface, since the axle 42 is rotationally connected to the free end 32 of the auxiliary arm 30, the wheel 40 swings relative to the connecting end 31 of the auxiliary arm 30 (as shown by the arrow in FIG. 4). In addition, since the free end 32 of the auxiliary arm 30 is connected to the vehicle body 10 via the vibration absorbing element 20, the vibration absorbing element 20 can absorb the vibration from the wheels 40, thereby reducing the vibration on the vehicle body 10 of the wheeled vehicle 100. Since the motor 50 is fixed to the vehicle body 10, the vibration on the motor 50 is also greatly reduced, achieving the effect of protecting the motor 50.

Figure 6:
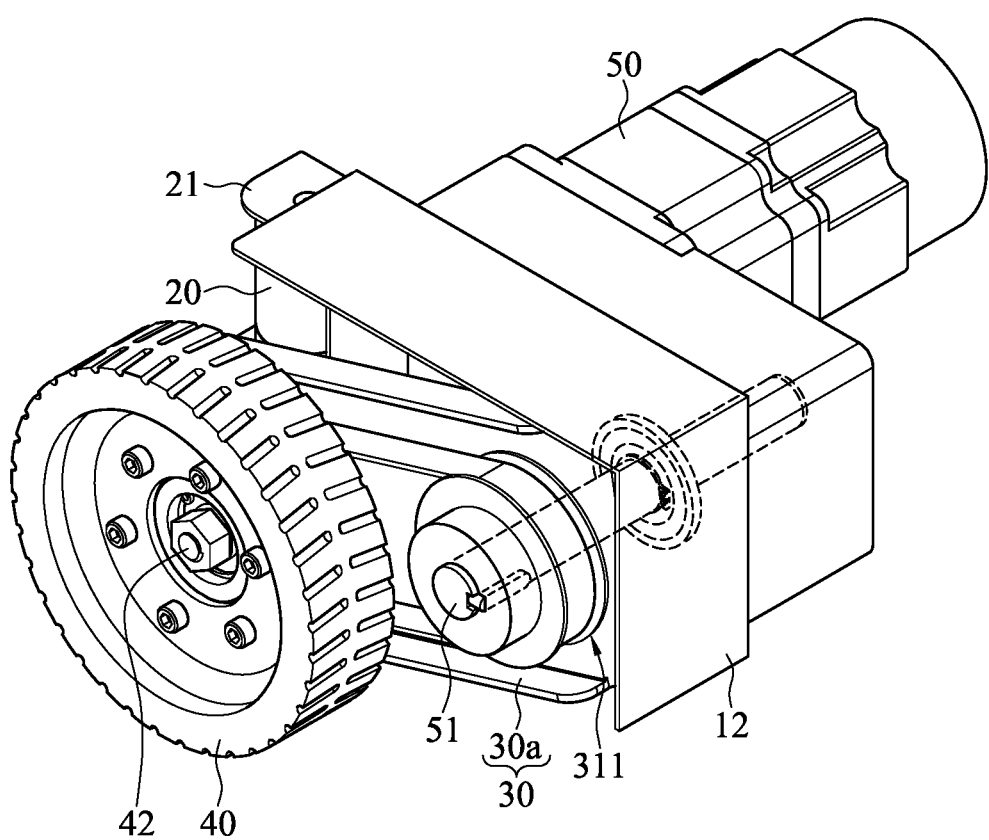
FIG. 6 illustrates a partial three-dimensional view of a wheeled vehicle according to some embodiments.

In some embodiments, the auxiliary arm 30 is a rocker arm (as shown in FIG. 4), and the connecting end 31 of the rocker arm is pivotally connected to the vehicle body 10 (the specific structure of the implementation will be described later), so that the free end 32 pivots relative to the connecting end 31. Therefore, when the vibration of the wheel 40 is transmitted to the auxiliary arm 30, the axle 42 drives the free end 32 to pivot, and the vibration absorbing element 20 can absorb the vibration from the wheel 40. In some embodiments, the auxiliary arm 30 is a cantilever 30a (as shown in FIG. 6), and a connecting end 31 of the cantilever 30a is fixed to the vehicle body 10 (the specific structure of the implementation will be described later), so that the cantilever 30a can be bent due to elasticity of the cantilever 30a during travel and a free end 32 of the cantilever 30a can be bent relative to the connecting end 31. When the vibration of the wheel 40 is transmitted to the auxiliary arm 30, both the cantilever 30a and the vibration absorbing element 20 can absorb the vibration from the wheel 40.

In some embodiments, the wheeled vehicle 100 further includes a transmission mechanism 60, and the motor 50 is configured to drive, through the transmission mechanism 60, the wheel 40 to rotate. In some embodiments, the transmission mechanism 60 includes a flexible transmission set 70, and the motor 50 drives, through the flexible transmission set 70, the wheel 40 to rotate (detailed later). In some embodiments, the transmission mechanism 60 includes a reduction gear set 62 and a flexible transmission set 70, and the motor 50 drives, through the reduction gear set 62 and the flexible transmission set 70, the wheel 40 to rotate (detailed later).

In some embodiments, two ends 21, 22 of the vibration absorbing element 20 are respectively connected to the vehicle body 10 and the free end 32 of the auxiliary arm 30 in a fixed or pivotally connected manner. For example, the first end 21 of the vibration absorbing element 20 is fixed to the vehicle body 10, and the second end 22 is pivotally connected to the free end 32 of the auxiliary arm 30; or the first end 21 of the vibration absorbing element 20 is pivotally connected to the vehicle body 10, and the second end 22 is fixed to the free end 32 of the auxiliary arm 30; or the first end 21 of the vibration absorbing element 20 is pivotally connected to the vehicle body 10, and the second end 22 is pivotally connected to the free end 32 of the auxiliary arm 30. When the wheel 40 swings relative to the connecting end 31 of the auxiliary arm 30, the vibration absorbing element 20 can pivot relative to the vehicle body 10 and/or relative to the free end 32 of the auxiliary arm 30, so as to reduce the vibration, vibrational motion, shaking, shocking, or jolting transmitted from both ends of the vibration absorbing element. In addition, the two ends 21, 22 of the vibration absorbing element 20 may also be respectively connected to the vehicle body 10 and the free end 32 of the auxiliary arm 30 in a special fixing manner. For example, the fixing method is such that the first end 21 of the vibration absorbing element 20 and the vehicle body 10 can be displaced in a short distance in an axial direction (a horizontal axial direction in FIG. 4). In another example, the fixing method is such that the second end 22 of the vibration absorbing element 20 and the free end 32 of the auxiliary arm 30 can be displaced in a short distance in an axial direction (a long axial direction of the auxiliary arm 30 in FIG. 4). The fixing method is, for example, but not limited to, a fact that a first connecting hole 121 and/or a second connecting hole 322 (see FIG. 2B) are elongated holes.

In some embodiments, the vibration absorbing element 20 is a shock absorber, which includes a spring and a damping mechanism inside. The spring is fixed between the first end 21 and the second end 22 in a press-fit manner. The first end 21 and the second end 22 are two metal brackets, and the first end 21 is locked to the vehicle body 10 through bolts. In some embodiments, the vibration absorbing element 20 is a spring, the first end 21 and the second end 22 are metal or plastic brackets. The first end 21 may be fixed to the vehicle body 10 by welding or riveting. Therefore, the vibration at both ends is reduced through the vibration absorbing element 20. In some embodiments, the vibration absorbing element 20 is a damping mechanism, e.g. damper. Two ends of the damper are respectively connected to the vehicle body 10 and the free end 32 of the auxiliary arm 30 in a fixed or pivotally connected manner.

Figure 5:
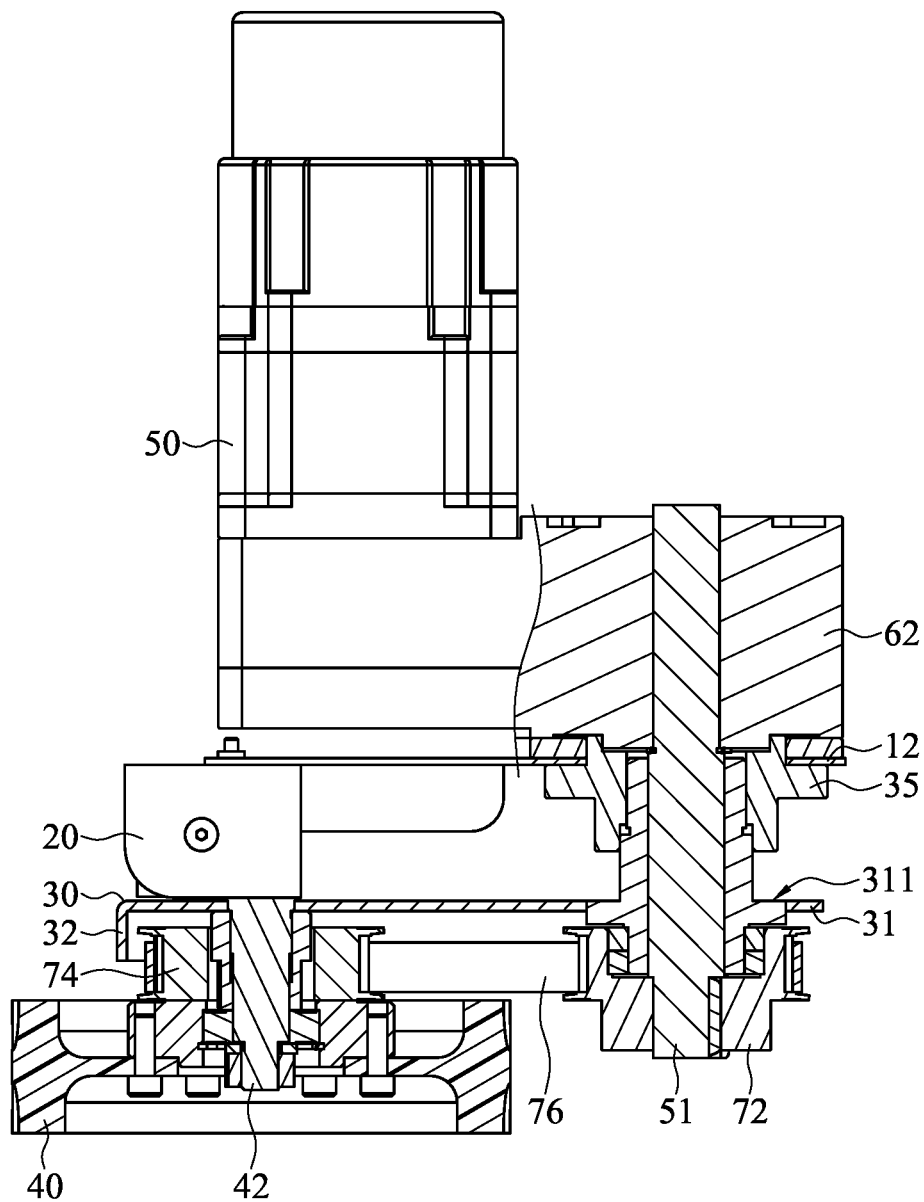
FIG. 5 illustrates a partial cross-sectional view of a position 5-5 in FIG. 4.

Mainly referring to FIG. 2B and FIG. 2A to FIG. 5 together, FIG. 5 illustrates a partial cross-sectional view of a position 5-5 in FIG. 4. In some embodiments, the vehicle body 10 includes a fixing plate 12, and the fixing plate 12 is provided with a first connecting hole 121. The vibration absorbing element 20 includes a first end 21 and a second end 22. The first end 21 is connected to the first connecting hole 121 of the fixing plate 12 of the vehicle body 10, both of which can be connected in a pivotally connected or fixed manner, as mentioned above. The auxiliary arm 30 includes a connecting end 31, a free end 32, a first shaft hole 311, a second shaft hole 321, and a second connecting hole 322. The first shaft hole 311 is adjacent to the connecting end 31, and the second shaft hole 321 and the second connecting hole 322 are adjacent to the free end 32. The connecting end 31 is connected to the fixing plate 12 in a pivotally connected or fixed manner, as mentioned above. The second end 22 of the vibration absorbing element 20 is connected to the second connecting hole 322. The wheel 40 includes an axle 42, and the axle 42 is rotationally connected to the second shaft hole 321. The motor 50 is fixed to the fixing plate 12 through screw locking, pin connection, riveting, or other methods. In some embodiments, the motor 50 includes a motor shaft 51, and the motor shaft 51 penetrates the fixing plate 12 and extends through the first shaft hole 311 of the connecting end 31. In some embodiments, the free end 32 is configured to swing relative to the connecting end 31.

In some embodiments, the transmission mechanism 60 includes a reduction gear set 62 and a flexible transmission set 70. The flexible transmission set 70 includes a driving wheel 72, a driven wheel 74, and a flexible element 76. The driving wheel 72 is rotationally connected to the connecting end 31. The driven wheel 74 is rotationally connected to the free end 32. The flexible element 76 is connected to the driving wheel 72 and the driven wheel 74. The motor 50 drives, through the reduction gear set 62, the motor shaft 51 to drive the driving wheel 72 to rotate, and drives, through the driving wheel 72, the flexible element 76, and the driven wheel 74, the wheel 40 to rotate. Therefore, when the wheel 40 vibrates and drives the driven wheel 74 to vibrate, the vibration can be absorbed by the flexible element 76 and not transmitted to the driving wheel 72, so as to achieve a better effect of protecting the motor 50. In some embodiments, the motor shaft 51 and the driving wheel 72 are fixed to each other, and the driven wheel 74 is mutually fixed to the axle 42 and the wheel 40, respectively.

In some embodiments, the flexible transmission set 70 is a belt transmission set, which is not limited thereto. As shown in FIG. 4, the driving wheel 72 is a driving pulley, the driven wheel 74 is a driven pulley, and the flexible element 76 is a belt. The belt is tensioned between the driving pulley and the driven pulley, and the motor is configured to drive, through the driving pulley, the belt, and the driven pulley, the wheel 40 to rotate. The belt transmission set may further include a tension pulley, which is configured to control the tension of the belt. In some embodiments, the belt transmission set may select a positive drive pulley and a positive drive belt. The driving belt is molded into a tooth shape through the belt and is meshed with the driving pulley with the corresponding tooth surface, to produce driving transmission.

Although not shown in the figure, in some embodiments, the driving wheel 72 is also a driving chain wheel, the driven wheel 74 may also be a driven chain wheel, and the flexible element 76 may also be a chain. The chain is connected to the driving chain wheel and the driven chain wheel, and the motor 50 is configured to drive, through the driving chain wheel, the chain, and the driven chain wheel, the wheel 40 to rotate. The above flexible transmission set 70 can absorb the vibration from the wheel 40 and protect the motor 50 by adopting a belt transmission set or a chain transmission set. Since the belt of the belt transmission set is more flexible than the chain of the chain transmission set, the belt transmission set has better effects of absorbing vibration and protecting the motor 50.

In some embodiments, the auxiliary arm 30 is a rocker arm (as shown in FIG. 4). The rocker arm further includes a connecting shaft 35, the connecting shaft 35 is fixed to the fixing plate 12, and the connecting end 31 of the rocker arm is pivotally connected to the connecting shaft 35. When the wheeled vehicle 100 travels on the uneven ground, the free end 32 pivots relative to the connecting shaft 35 of the connecting end 31. As shown in FIG. 4, in some embodiments, the motor shaft 51 penetrates the fixing plate 12 and the connecting shaft 35, and extends through the first shaft hole 311 of the connecting end 31. A center of the motor shaft 51 is substantially coaxial with a center of the first shaft hole 311, and a distance L1 from the center of the motor shaft 51 to the center of the axle 42 is substantially equal to a distance L2 from the center of the first shaft hole 311 to the center of the axle 42. When the rocker arm pivots due to vibration, the transmission mechanism 60 can reduce the influence of vibration and maintain stable transmission. Herein, "substantial" means that the length can exist within the range of tolerance/margin.

FIG. 6 illustrates a partial three-dimensional view of a wheeled vehicle according to some embodiments. As shown in FIG. 6, in some embodiments, an auxiliary arm 30 is a cantilever 30a, and a connecting end 31 of the cantilever 30a is fixed to a fixing plate 12. For example, the connecting end 31 is fixed to the fixing plate 12 by means of locking, welding, or riveting. The cantilever 30a is a plate with elasticity. When the wheeled vehicle 100 travels on an uneven ground and causes swinging, the cantilever 30a may cause, due to elasticity itself, the free end 32 to bend relative to the connecting end 31. In addition to the shock absorbing element 20, the cantilever 30a also can absorb vibration. As shown in FIG. 4, in some embodiments, the motor shaft 51 penetrates the fixing plate 12, and extends through the first shaft hole 311 of the connecting end 31. A center of the first shaft hole 311 and the center of the motor shaft 51 overlap each other. A distance L1 from the center of the motor shaft 51 to the center of the axle 42 is equal to a distance L2 from the center of the first shaft hole 311 to the center of the axle 42. When the cantilever 30a is bent due to vibration, the transmission mechanism 60 can reduce the influence of vibration and maintain stable transmission.

Figure 7:
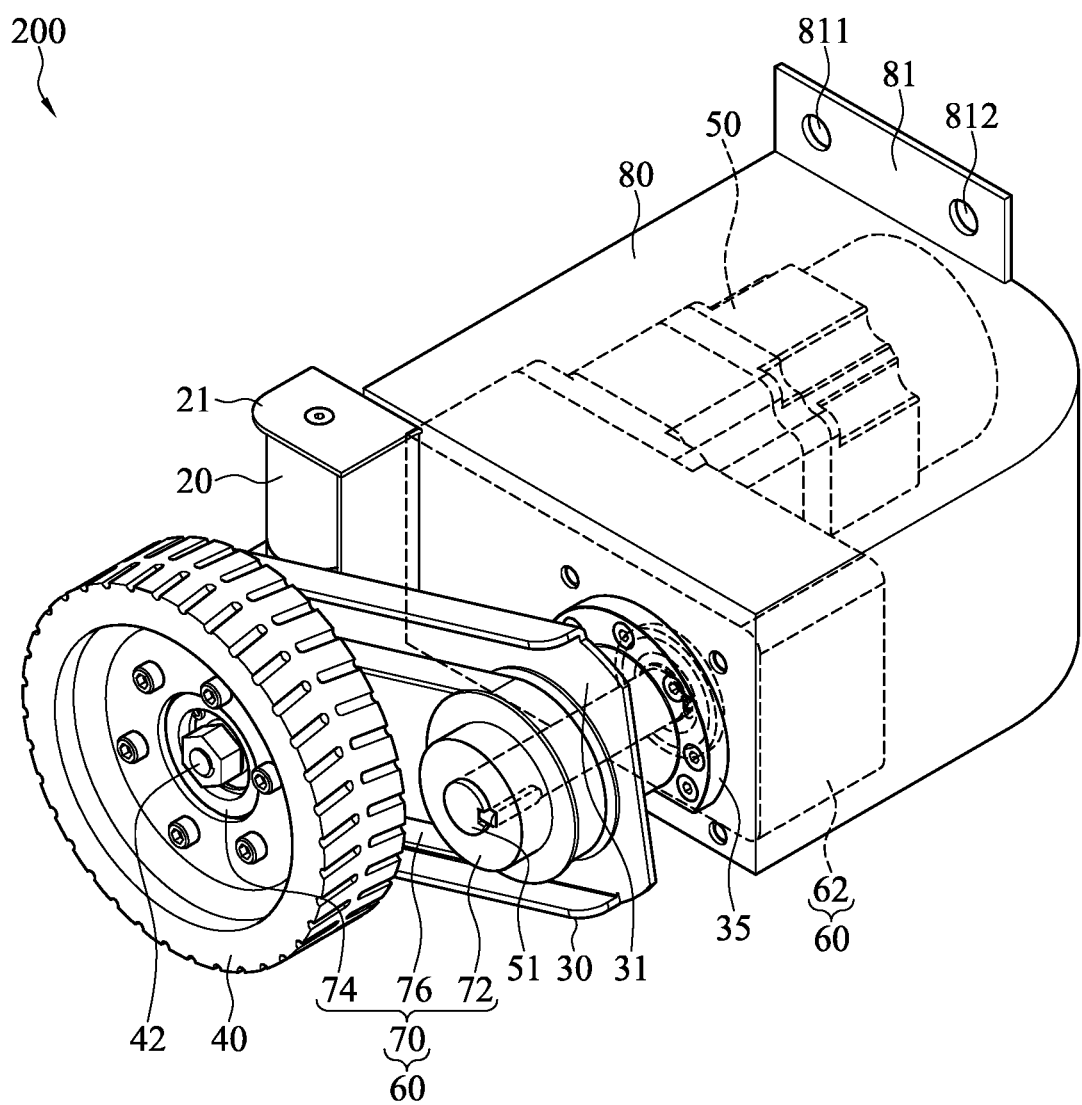
FIG. 7 illustrates a three-dimensional view of an independent-drive assembly according to some embodiments.

FIG. 7 illustrates a three-dimensional view of an independent-drive assembly according to some embodiments. An independent-drive assembly 200 includes a housing 80, a vibration absorbing element 20, an auxiliary arm 30, a wheel 40, and a motor 50. The independent-drive assembly 200 may be replaced with wheels of different types of wheeled vehicles, for example but not limited to an automated guided vehicle (AGV), an electric vehicle for riding, an electric passenger vehicle, an amphibious wheeled vehicle, and the like. The vibration absorbing element 20 includes a first end 21 and a second end 22. The first end 21 is connected to the housing 80. The auxiliary arm 30 includes a connecting end 31 and a free end 32, the connecting end 31 is connected to the housing 80, and the free end 32 is connected to the second end 22. The wheel 40 includes an axle 42, and the axle 42 is rotationally connected to the free end 32. The motor 50 is fixed to the housing 80 and configured to drive the wheel 40 to rotate. In some embodiments, the free end 32 is configured to swing relative to the connecting end 31.

In some embodiments, the housing 80 further includes a locking plate 81 with locking holes 811, 812 thereon, and the independent-drive assembly 200 can be mounted to other wheeled vehicles through screw locking, pin connection, riveting, or other methods via the locking holes 811, 812 of the locking plate 81. When the independent-drive assembly 200 is mounted to the wheeled vehicle, the independent-drive assembly 200 is activated, so that the motor 50 drives the wheels 40 to rotate, and the wheeled vehicle can travel. During travelling, the weight of the wheeled vehicle itself will press the wheel 40 downward, so that the wheel 40 can be attached to the travelling surface as far as possible. When the wheeled vehicle travels to the uneven surface, since the axle 42 is rotationally connected to the free end 32 of the auxiliary arm 30, the wheel 40 swings relative to the connecting end 31 of the auxiliary arm 30. In addition, since the free end 32 of the auxiliary arm 30 is connected to the housing 80 via the vibration absorbing element 20, the vibration absorbing element 20 can absorb the vibration from the wheels 40, thereby reducing the vibration on the wheeled vehicle. Since the motor 50 is fixed to the housing 80, the vibration on the motor 50 is also greatly reduced, achieving the effect of protecting the motor 50.

In some embodiments, the auxiliary arm 30 is a rocker arm, and the connecting end 31 of the rocker arm is pivotally connected to the housing 80, so that the free end 32 pivots relative to the connecting end 31. Therefore, when the vibration of the wheel 40 is transmitted to the auxiliary arm 30, the axle 42 drives the free end 32 to pivot, and the vibration absorbing element 20 can absorb the vibration from the wheel 40. In some embodiments, the auxiliary arm 30 is a cantilever 30a, and a connecting end 31 of the cantilever 30a is fixed to the housing 80, so that a free end 32 of the cantilever 30a can be bent relative to the connecting end 31 due to elasticity of the cantilever 30a. When the vibration of the wheel 40 is transmitted to the auxiliary arm 30, both the cantilever 30a and the vibration absorbing element 20 can absorb the vibration from the wheel 40.

As shown in FIG. 7, in some embodiments, the rocker arm further includes a connecting shaft 35, the connecting shaft 35 is fixed to the housing 80, and the connecting end 31 of the rocker arm is pivotally connected to the connecting shaft 35. The free end 32 pivots relative to the connecting shaft 35 of the connecting end 31. In some embodiments, the motor shaft 51 penetrates the housing 80 and the connecting shaft 35.

Although not shown in the figure, in some embodiments, the connecting end 31 of the cantilever 30a is fixed to the housing 80. For example, the connecting end 31 is fixed to the housing 80 by means of locking, welding, or riveting. The cantilever 30a is a plate with elasticity. When the wheeled vehicle travels on an uneven ground and causes swinging, the cantilever 30a may cause, due to elasticity itself, the free end 32 to bend relative to the connecting end 31. In addition to the shock absorbing element 20, the cantilever 30a also can absorb vibration. In some embodiments, the motor shaft 51 penetrates the housing 80.

FIG. 8 illustrates a three-dimensional exploded view of an independent-drive set according to some embodiments. An independent-drive set 300 is adapted to be fixed to a vehicle body 90. The independent-drive set 300 includes a vibration absorbing element 20, an auxiliary arm 30, a wheel 40, and a motor 50. The independent-drive set 300 may be respectively fixed to the vehicle body 90 through screwing, pinning, riveting, or other methods, and the vehicle body 90 may be a part of the vehicle body or the housing of various wheeled vehicles. The independent-drive set 300 may be respectively mounted to different types of wheeled vehicles to replace the wheels of the wheeled vehicles. The vibration absorbing element 20 includes a first end 21 and a second end 22. The first end 21 is connected to the vehicle body 90. The auxiliary arm 30 includes a connecting end 31 and a free end 32, the connecting end 31 is connected to the vehicle body 90, and the free end 32 is connected to the second end 22. The wheel 40 includes an axle 42, and the axle 42 is rotationally connected to the free end 32. The motor 50 is fixed to the vehicle body 90 and configured to drive the wheel 40 to rotate. In some embodiments, the free end 32 is configured to swing relative to the connecting end 31.

In some embodiments, the vehicle body 90 is provided with mounting holes matching the independent-drive set 300, for example, a first connecting hole 92, a positioning hole 94, and a positioning hole 96. The vibration absorbing element 20 includes a first end 21 and a second end 22. The first end 21 is fixed to the first connecting hole 92 of the vehicle body 90. The auxiliary arm 30 includes a connecting end 31, a free end 32, and a second connecting hole 322. The connecting end 31 is connected to the vehicle body 90, and the second end 22 of the vibration absorbing element 20 is pivotally connected to the second connecting hole 322. The motor 50 is fixed to the positioning hole 94 of the vehicle body 90. The motor 50 includes a motor shaft 51, and the motor shaft 51 penetrates the vehicle body 90. In some embodiments, the free end 32 is configured to swing relative to the connecting end 31.

In some embodiments, the rocker arm further includes a connecting shaft 35, the connecting shaft 35 is fixed to the positioning hole 96 of the vehicle body 90, and the connecting end 31 of the rocker arm is pivotally connected to the connecting shaft 35. When the wheeled vehicle travels on the uneven ground, the free end 32 pivots relative to the connecting shaft 35 of the connecting end 31.

Figure 9:
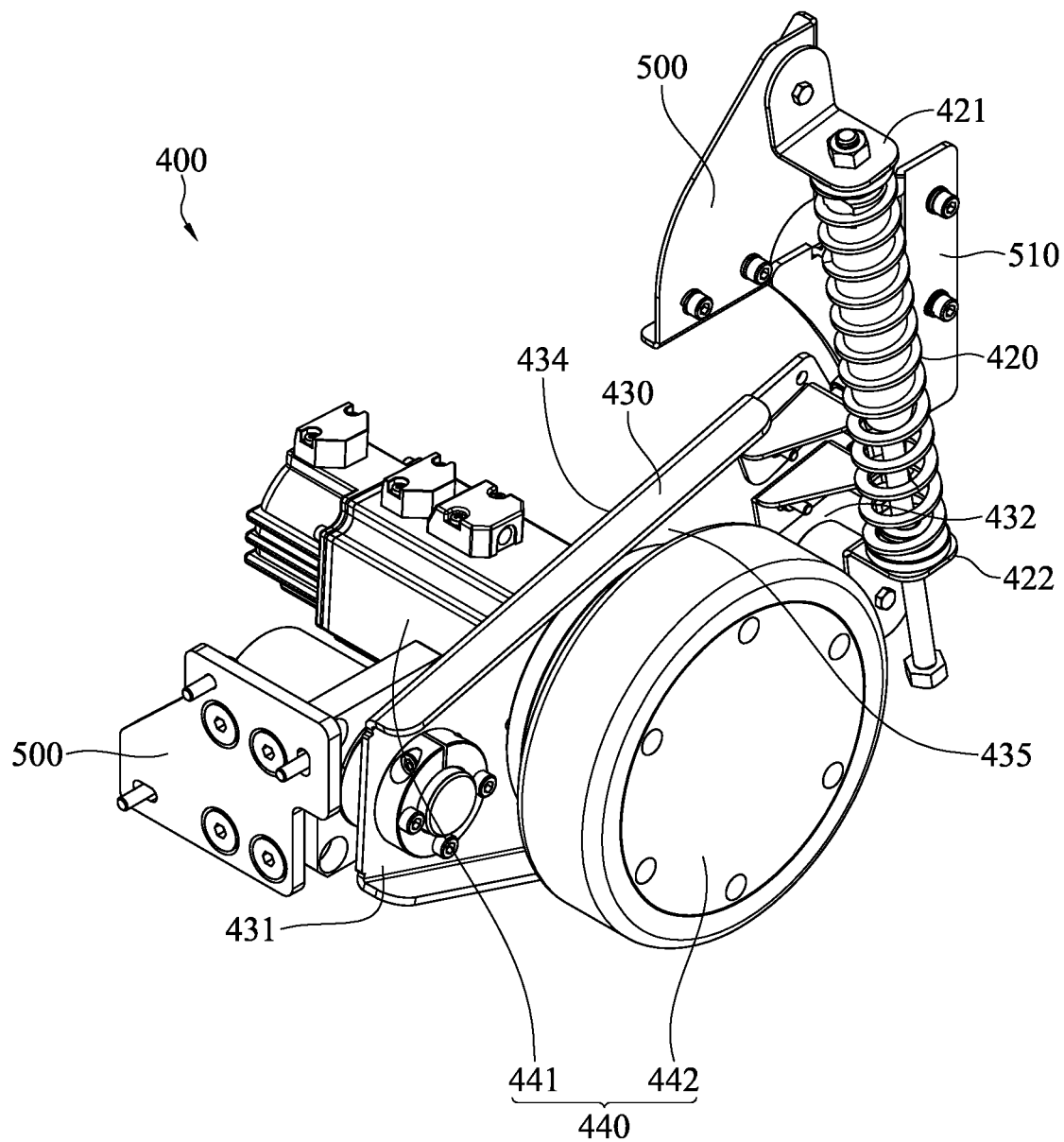
FIG. 9 illustrates a three-dimensional view of an independent-drive set according to some embodiments.
Figure 10:
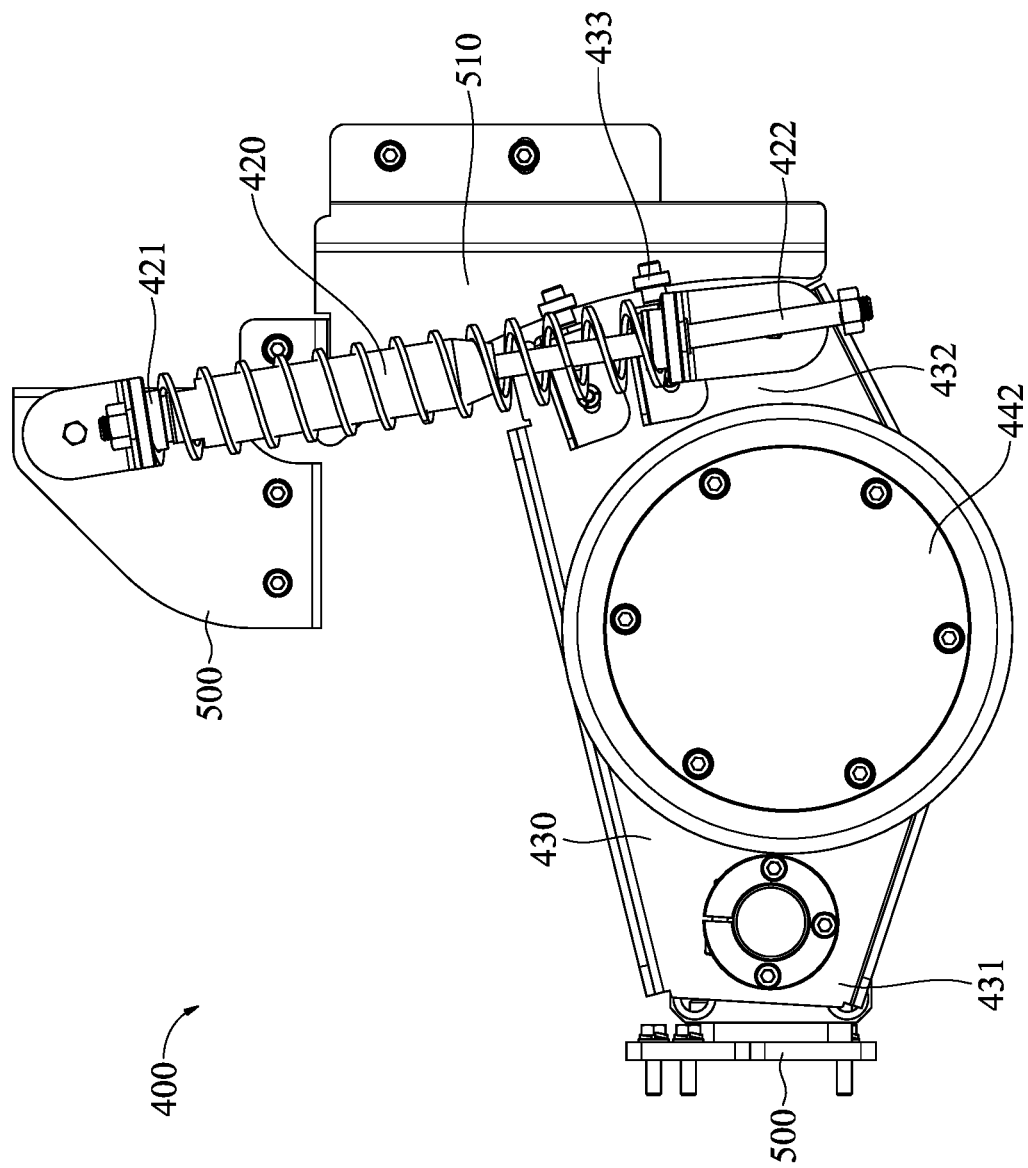
FIG. 10 illustrates a schematic swing view (1) of the auxiliary arm of the independent-drive set according to some embodiments.
Figure 11:
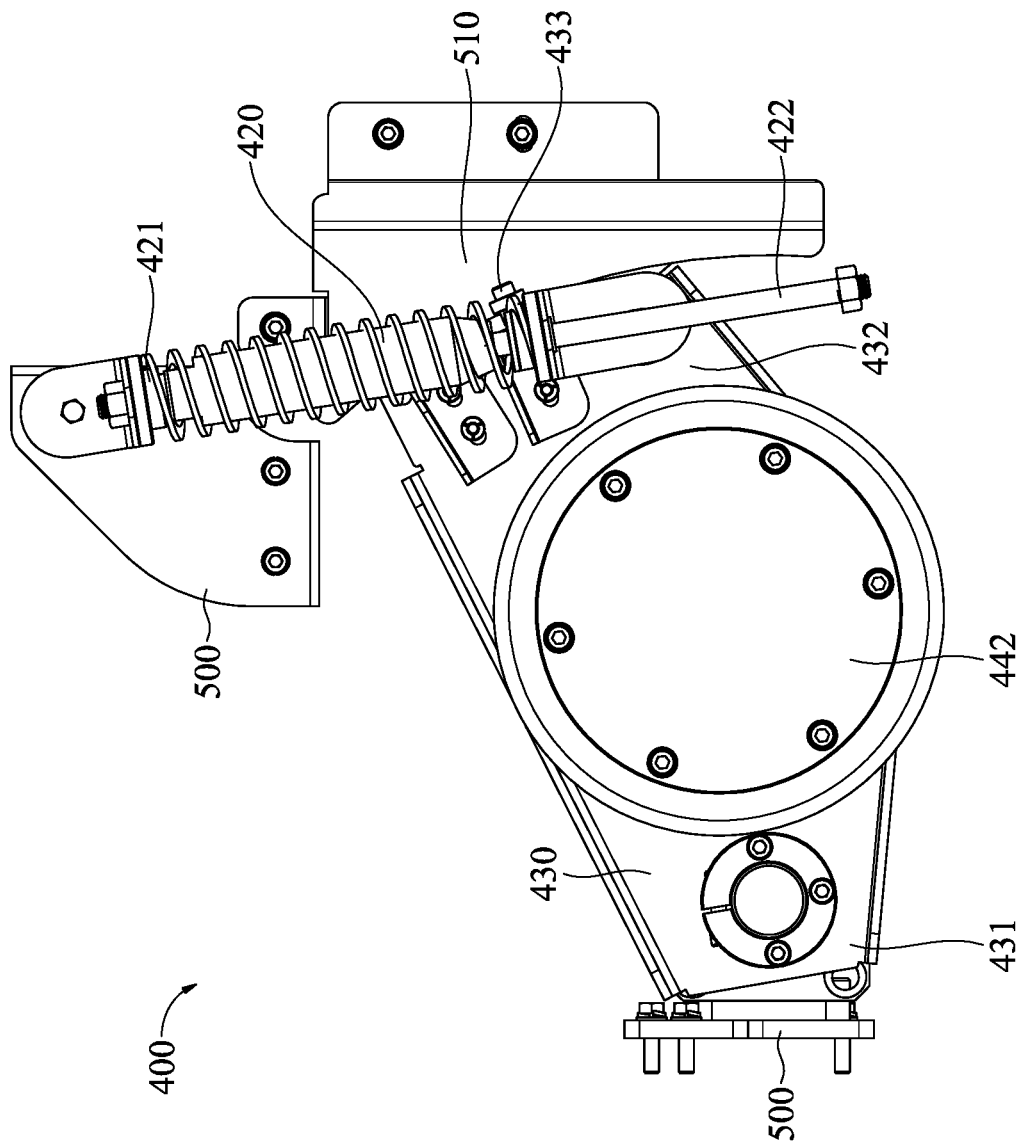
FIG. 11 illustrates a schematic swing view (2) of the auxiliary arm of the independent-drive set according to some embodiments.

Please refer to FIG. 9 to FIG. 11. FIG. 9 illustrates a three-dimensional view of an independent-drive set according to some embodiments. FIG. 10 illustrates a schematic swing view (1) of the auxiliary arm of the independent-drive set according to some embodiments. FIG. 11 illustrates a schematic swing view (2) of the auxiliary arm of the independent-drive set according to some embodiments. In some embodiments, an independent-drive set 400 is provided. The similar structures to other embodiments will not be repeated. The independent-drive set 400 is adapted to a vehicle body 500. The independent-drive set 400 includes a vibration absorbing element 420, an auxiliary arm 430 and a drive component 440. The vibration absorbing element 420 includes a first end 421 and a second end 422. The first end 421 is adapted to be connected to the vehicle body 500. The auxiliary arm 430 includes a connecting end 431 and a free end 432. The connecting end 431 is adapted to be connected to the vehicle body 500, and the free end 432 is connected to the second end 422. The drive component 440 includes a driving member 441 and a wheel 442 The driving member 441 is connected to the wheel 442 and drives the wheel 442. The driving member 441 and the wheel 442 are respectively fixed on opposite sides of the auxiliary arm 430, for example, the driving member 441 is fixed on a first side surface 434 of the auxiliary 430, and the wheel 442 is fixed on a second side surface 435 of the auxiliary 430. As shown in FIGS. 9 to 11, the independent-drive set 400 is applied to the vehicle body 500. During travelling, the weight of the wheeled vehicle 500 will press the wheel 442 downward, so that the wheel 442 is attached to the travelling surface. When the wheeled vehicle 500 travels to an uneven surface, the free end 432 will swings relative to the connecting end 431 (as shown by the arrow in FIGS. 10 and 11). Since the free end 432 of the auxiliary arm 430 is connected to the vehicle body 500 via the vibration absorbing element 420, the vibration absorbing element 420 can absorb the vibration from the wheel 442, thereby reducing the vibration on the driving member 441. In addition, by fixing the driving member 441 on the auxiliary arm 430 to increase the extra positive force, the stability of the movement of the vehicle body 500 is improved. Further, the structural design of the independent-drive set 400 is simplified and the cost consumption is reduced.

In some embodiments, the drive component 440 further comprises a reduction gear set 443 located in the drive component. The driving member 441 drives the wheel 442 through the reduction gear set.

Figure 12:
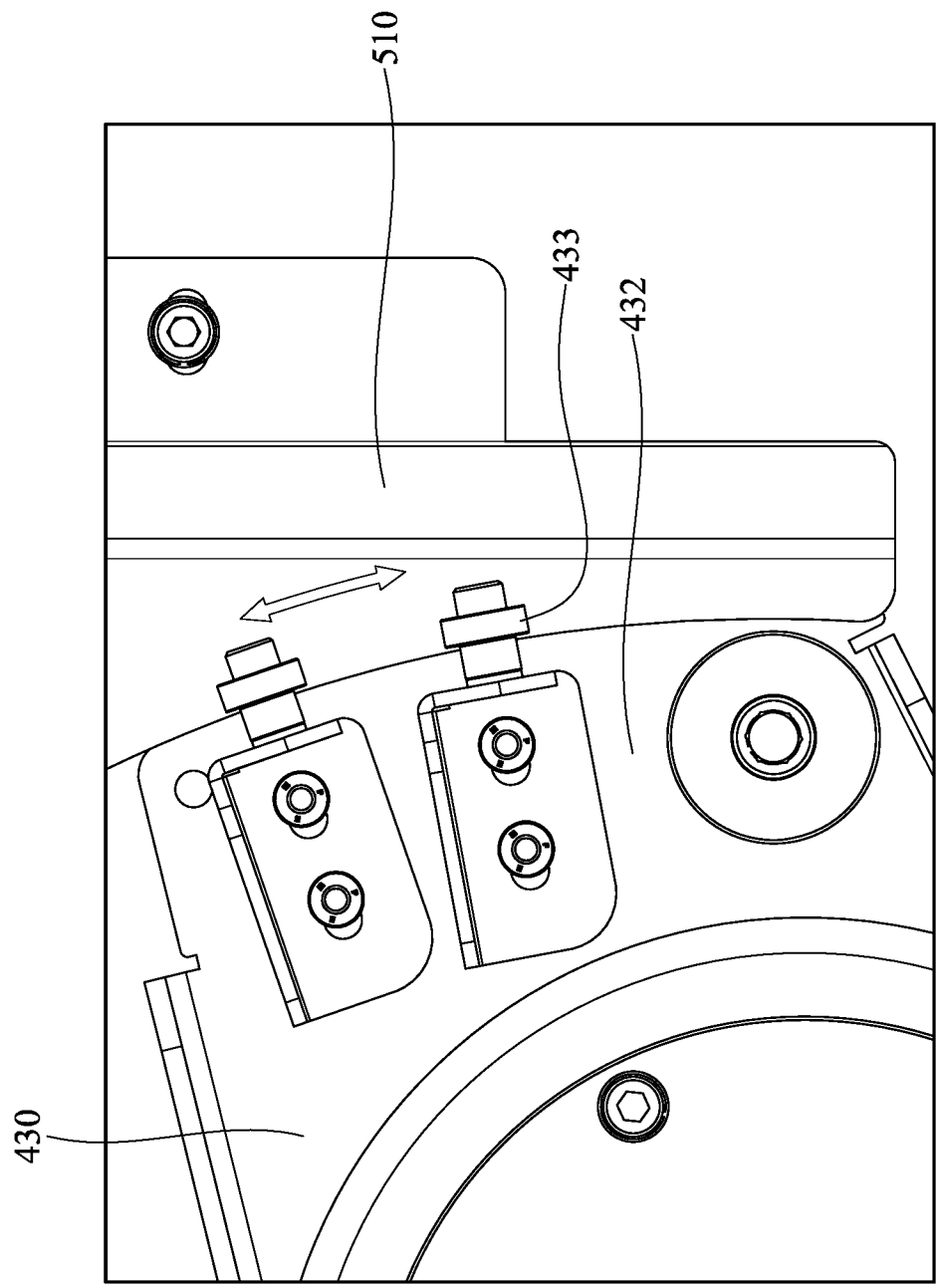
FIG. 12 illustrates a schematic view of the guide plate and the guide wheel according to some embodiments.

As shown in FIGS. 10, 11, and 12. FIG. 12 illustrates a schematic view of the guide plate and the guide wheel according to some embodiments. In some embodiments, the vehicle body 500 comprises a guide plate 510, the auxiliary arm 430 comprises a guide wheel 433. The guide wheel 433 is arranged at the free end 432, and the guide wheel 433 moves on the guide plate 510 as the auxiliary arm 430 swings. Since guide plate 510 guides the guide wheel 433, the movement of the auxiliary arm 430 can only be swung up and down, thereby avoiding the lateral sway. In some embodiments, the guide plate 510 is, for example, a part of the vehicle body 500, or a plate that is additionally assembled to the vehicle body 500.

As shown in FIGS. 10 and 11, in some embodiments, the first end 421 of the vibration absorbing element 420 is adapted to be pivotally connected to the vehicle body 500, so that the second end 422 pivots relative to the first end 421. In this way, when the auxiliary arm 430 swings, the vibration absorbing element 420 can also swing relative to the vehicle body 500.

Based on the above, in some embodiments, the motor 50 is fixed to the vehicle body 10 of the wheeled vehicle 100. When the wheel 40 vibrates on an uneven surface, the vibration absorbing element 20 can absorb the vibration, and the auxiliary arm 30 swings, so that the vibration will not be transmitted back to the motor 50, thereby achieving the effect of protecting the motor 50. In some embodiments, the motor 50 drives the wheel 40 through the flexible transmission set 70, and the vibration of the wheel 40 is not transmitted to the motor 50 through a transmission path via the flexible transmission set 70, so that the motor 50 can be better protected.

What is claimed is:

1. A wheeled vehicle, comprising:
   a vehicle body comprising a fixing plate;
   a housing, connected to the fixing plate;
   a vibration absorbing element comprising a first end and a second end, wherein the first end is connected to the housing;
   an auxiliary arm comprising a connecting end and a free end, wherein the connecting end is connected to the housing, and the free end is connected to the second end;
   a wheel comprising an axle, wherein the axle is rotationally connected to the free end; and
   a driving member fixed to the housing and configured to drive the wheel;
   wherein the housing comprises a guide plate, the auxiliary arm comprises a guide wheel, the guide wheel is arranged at the free end, and the guide wheel is movably in contact with the guide plate.

2. The wheeled vehicle according to claim 1, wherein the auxiliary arm is a rocker arm, and the connecting end of the rocker arm is pivotally connected to the housing, so that the free end pivots relative to the connecting end.

3. The wheeled vehicle according to claim 2, further comprising a transmission mechanism, wherein the driving member is configured to drive the wheel through the transmission mechanism.

4. The wheeled vehicle according to claim 3, wherein the transmission mechanism comprises:
   a driving wheel pivotally connected to the connecting end;
   a driven wheel pivotally connected to the free end; and
   a flexible element connected to the driving wheel and the driven wheel, wherein the driving member is configured to drive the wheel through the driving wheel, the flexible element, and the driven wheel.

5. The wheeled vehicle according to claim 4, wherein the driving wheel is a driving pulley, the driven wheel is a driven pulley, and the flexible element is a belt, wherein the belt is connected to the driving pulley and the driven pulley, and the driving member is configured to drive the wheel through the driving pulley, the belt, and the driven pulley.

6. The wheeled vehicle according to claim 5, wherein the transmission mechanism further comprises a reduction gear set, and the driving member drives the driving wheel through the reduction gear set.

7. The wheeled vehicle according to claim 6, wherein the vibration absorbing element is a shock absorber.

8. The wheeled vehicle according to claim 4, wherein the driving wheel is a driving chain wheel, the driven wheel is a driven chain wheel, and the flexible element is a chain, wherein the chain is connected to the driving chain wheel and the driven chain wheel, and the driving member is configured to drive the wheel through the driving chain wheel, the chain, and the driven chain wheel.

9. The wheeled vehicle according to claim 1, wherein the auxiliary arm is a cantilever, and a connecting end of the cantilever is fixed to the housing, so that the free end is bent relative to the connecting end.

10. An independent-drive set adapted to a vehicle body comprising a fixing plate, wherein the independent-drive set comprises:
   a housing, adapted to be connected to the fixing plate;
   a vibration absorbing element comprising a first end and a second end, wherein the first end is adapted to be connected to the housing;
   an auxiliary arm comprising a connecting end and a free end, wherein the connecting end is adapted to be connected to the housing, and the free end is connected to the second end;
   a wheel comprising an axle, wherein the axle is rotationally connected to the free end; and
   a driving member adapted to be fixed to the housing and configured to drive the wheel;
   wherein the housing comprises a guide plate, the auxiliary arm comprises a guide wheel, the guide wheel is arranged at the free end, and the guide wheel is movably in contact with the guide plate.

11. The independent-drive set according to claim 10, wherein the auxiliary arm is a rocker arm, and the connecting end of the rocker arm is adapted to be pivotally connected to the housing, so that the free end pivots relative to the connecting end.

12. The independent-drive set according to claim 11, further comprising a transmission mechanism and a reduction gear set, wherein the transmission mechanism comprises:
   a driving pulley pivotally connected to the connecting end;
   a driven pulley pivotally connected to the free end; and
   a belt connected to the driving pulley and the driven pulley, wherein the driving member is configured to drive the wheel through the reduction gear set, the driving pulley, the belt, and the driven pulley, wherein the vibration absorbing element is a shock absorber.

13. The independent-drive set according to claim 10, wherein the auxiliary arm is a cantilever, and a connecting end of the cantilever is adapted to be fixed to the housing, so that the free end is bent relative to the connecting end.

14. An independent-drive set adapted to a vehicle body, wherein the independent-drive set comprises:
   a vibration absorbing element comprising a first end and a second end, wherein the first end is adapted to be connected to the vehicle body;
   an auxiliary arm comprising a connecting end and a free end, wherein the connecting end is adapted to be connected to the vehicle body, and the free end is connected to the second end; and
   a drive component comprising a driving member and a wheel, the driving member is connected to the wheel;
   wherein the vehicle body comprises a guide plate, the auxiliary arm comprises a guide wheel, the guide wheel is arranged at the free end, and the guide wheel is movably in contact with the guide plate.

15. The independent-drive set according to claim 14, wherein the auxiliary arm is a rocker arm, and the connecting end of the rocker arm is adapted to be pivotally connected to the vehicle body, so that the free end pivots relative to the connecting end.

16. The independent-drive set according to claim 14, wherein the first end of the vibration absorbing element is adapted to be pivotally connected to the vehicle body, so that the second end pivots relative to the first end.

17. The independent-drive set according to claim 14, wherein the driving member and the wheel are respectively fixed on opposite sides of the auxiliary arm.

* * * * *